United States Patent [19]

Oba et al.

[11] Patent Number: 5,454,035
[45] Date of Patent: Sep. 26, 1995

[54] ELECTRONIC APPARATUS

[75] Inventors: Toshiro Oba, Ikoma; Eichika Matsuda, Yamato-Takada; Taizou Nishida, Ikoma, all of Japan

[73] Assignee: Sharp Kabushiki Kaisha, Osaka, Japan

[21] Appl. No.: 236,698

[22] Filed: Apr. 28, 1994

Related U.S. Application Data

[63] Continuation of Ser. No. 700,790, May 14, 1991, abandoned.

[30] Foreign Application Priority Data

May 16, 1990 [JP] Japan ................................. 2-125915
May 16, 1990 [JP] Japan ................................. 2-125916
Jun. 7, 1990 [JP] Japan ................................. 2-150876

[51] Int. Cl.⁶ .................... H04M 11/04; H04M 3/42; H04M 1/00
[52] U.S. Cl. .................... 379/354; 379/40; 379/51; 379/216; 379/355; 379/356
[58] Field of Search .................... 379/354, 355, 379/356, 396, 216, 96, 40, 51; 340/765

[56] References Cited

U.S. PATENT DOCUMENTS

| | | |
|---|---|---|
| 4,104,627 | 8/1978 | Thuler ................................. 340/765 |
| 4,201,887 | 5/1980 | Burns . |
| 4,307,391 | 12/1981 | Lewis ................................. 379/354 |
| 4,980,910 | 12/1990 | Oba et al. . |
| 4,982,423 | 1/1991 | Muroi ................................. 379/354 |
| 5,119,417 | 6/1992 | Suzuki et al. ..................... 379/354 |

FOREIGN PATENT DOCUMENTS

| | | | |
|---|---|---|---|
| 0072456 | 4/1985 | Japan | ................................. 379/354 |
| 0116050 | 5/1987 | Japan | ................................. 379/354 |
| 1319350 | 12/1989 | Japan . | |
| 221761 | 1/1990 | Japan . | |
| 236654 | 2/1990 | Japan . | |

OTHER PUBLICATIONS

U.S. Ser. No. 07/343,384, filed Apr. 26, 1989.

Primary Examiner—Jeffery A. Hofsass
Assistant Examiner—Jack Chiang
Attorney, Agent, or Firm—David C. Conlin; George W. Neuner; Brian L. Michaelis

[57] ABSTRACT

An electronic apparatus capable of automatically dialing a phone number includes a unit for storing data, a unit for registering data of the phone number and a predetermined data on the storing unit, a unit for generating a tone signal for dialing the phone number, and a unit for controlling the tone signal generating unit to generate a tone signal corresponding to the phone number in case that the predetermined data is registered on the storing unit.

3 Claims, 13 Drawing Sheets

Fig. 9

AUTOMATIC
DIALING
PROCESS
NAME N C C
NUMBER 0070103-456-7890-*1234

| N C C  0 | (OUTPUT "0") |

↓

| N C C  00 | (OUTPUT "0") |

↓

| N C C  007 | (OUTPUT "7") |

↓

| N.C C  0070 | (OUTPUT "0") |

SWITCHED TO MANUAL DIALING AT THE NEXT INTERRUPT CODE

DO THE SAME PROCESSING AS MANUAL DIALING
DIAL "03-123-4567"

| INTERRUPT DIAL NUMBER ? |

0 KEY ↓

| INTERRUPT DIAL 0_ |

3 KEY ↓ (OUTPUT "0")

↓

| N C C  0 | (OUTPUT "0") |

RETURN WITH THE CCE KEY BEING PRESSED

↓

| N C C  03 | (OUTPUT "3") |

| INTERRUPT DIAL 03_ |

7 KEY ↓ (OUTPUT "3")

| INTERRUPT DIAL 03-.123-4567 |

(OUTPUT "7")

⋮

| N C C  56-7890-*123 | (OUTPUT "3") |

↓

| N C C  6-7890-*1234 | (OUTPUT "4" AND THE AUTOMATIC DIALING FINISHES) |

Fig. 12

```
KENICHI KOBAYASHI
03-456-7890
```

Fig. 13

```
KENICHI KOBAYASHI
03-456-7890
```

ELECTRONIC APPARATUS

This is a continuation of application Ser. No. 07/700.790 filed on May 14, 1991, now abandoned.

BACKGROUND OF THE INVENTION

1. Field of the Invention

The present invention relates to an electronic apparatus which is adapted to an electronic note, an electronic memo, and so forth and more particularly to the electronic apparatus being capable of automatically dialing a phone number stored therein.

2. Description of the Related Art

With keeping electronic apparatuses thinner and thinner in these days, more people have known apparatus which provides an electronic-note function for storing names and their phone numbers and displaying them, an electronic-memo function for storing several memos and displaying them, and an automatic tone-dialing function (tone dialer) for generating a tone (DTMF, that is, Dual Tone Multi-Frequency) signal corresponding to a phone number and sending out the tone signal onto a phone line.

This kind of apparatus is constructed to generate a tone signal corresponding to a phone number registered at an electronic-note mode. This apparatus thus has an advantageous capability of automatically transmitting the phone signal corresponding to the phone number without manually dialing the phone number only if names and their phone numbers are registered at an electronic-note mode.

The aforementioned apparatus, however, has a shortcoming that it is incapable of automatically transmitting the phone signal corresponding to the phone number contained in a memo registered at an electronic-memo mode, though it is capable of automatically transmitting the phone signal corresponding to the phone number registered only at the electronic-note mode.

In dialing, it is often necessary to take a communication path composed of a public phone managed by a first common carrier (CC), that is, Nippon Telegram and Telephone (NTT) corporation and a toll line managed by a new first common carrier (NCC) for the purpose of transmitting a phone signal outside of a signal-transmitting area. In this case, the caller is required to dial a number for the NCC, a phone number for the called person, a caller's phone number, and a password number in sequence. The called person's phone number is variable depending on each called person. The other numbers are unchanged.

In order to cope with such a case, two methods have been provided for manually dialing a phone number for the called person and automatically dialing the other predetermined numbers.

One method includes the steps of pre-setting a pause period for manual dialing when registering the other predetermined numbers, and of manually dialing the called person's phone number for the pause period through dial keys on a public phone. This method, however, has a shortcoming that the caller cannot manually dial the phone number through the template keys provided on the automatic dialing apparatus while the registered data are being read out, because the registered data, that is, the NCC number, the pause period, and the password number compose one block of data.

For the other method, the caller can manually dial the phone number for the called person through the template keys provided on the automatic dialing apparatus. This method includes the steps of registering a first half dialing number and a last half dialing number as respective blocks of data, of reading the first half dialing number for automatically dialing the first half number, of manually dialing the phone number on the template keys provided on the automatic dialing apparatus, and then of reading the last half dialing number for automatically dialing the last half number.

As shortcomings, the former dialing method requires the caller to manually dial a phone number for a pre-set pause period through the dialing keys on a public phone. It is thus necessary to keep the automatic dialing apparatus in contact with a microphone of the public phone for manual dialing, resulting in requiring the caller to do the unnatural handling.

The latter dialing method can overcome the foregoing shortcoming, because the method makes it possible to manually dial a phone number through the template keys. However, the method is required to retrieve the automatic dialing number twice, resulting in requiring the caller to do the troublesome operation.

In turn, the description will be directed to a display unit for displaying the content (names and their phone numbers) of the data retrieved in the electronic note or memo. When a user handles a predetermined key (character input key, for example, which will be referred to as data key) provided in the electronic apparatus, the display unit serves to rewrite the displayed data. In case that the user is about to call as seeing the displayed phone number, however, the user often erroneously handles the data key. It results in causing the displayed phone number to change so that the user cannot see the necessary phone number.

To cope with this shortcoming, the inventors of the present invention know two methods for overcoming this shortcoming. For the first method, the electronic apparatus such as an electronic note or an electronic memo provides a function of invalidating any handling of the data key while the data are displayed. For the second method, the electronic apparatus provides a special key for calling the original data if the displayed content is erroneously changed.

The first method requires the user to release a data-key-invalidation mode with a predetermined key (a clear key, for example) when the user wants to input new data. Hence, the user suffers from the troublesome key handling. Besides, in actual, it is often impossible to invalidate the handling of all the data keys in light of the technical problem about the key arrangement.

The second method has a shortcoming that the display is changed when the user erroneously handles a special key. As another problem, this method makes it possible to call the display back with the special key when the user erroneously presses a character input key contained in the data keys. However, in case that the user erroneously handles the data key except the character input keys, it is necessary to call the data back again.

Further, there exists a problem common to the first and the second methods. In case that the user erroneously handles a data calling key, another piece of data is called and displayed. Hence, it is necessary to retrieve the data again for calling the previously displayed data.

SUMMARY OF THE INVENTION

It is therefore a first object of the present invention to provide an electronic apparatus having an automatic dialing capability which is capable of automatically transmitting a phone signal corresponding to a phone number stored at an electronic-memo mode.

It is a second object of the present invention to provide an electronic apparatus having an automatic dialing capability which is capable of switching automatic dialing to manual dialing with simple operation.

It is a third object of the present invention to provide an electronic apparatus having an automatic dialing capability which is capable of fixing the content displayed on a display unit with simple handling and easily releasing the fixed state in order to prevent the situation that the displayed content disappears with erroneous handling.

The first object of the present invention can be achieved by an electronic apparatus capable of automatically dialing a phone number including:

a unit for storing data;

a unit for registering data of the phone number and a predetermined data on the storing unit;

a unit for generating a tone signal for dialing the phone number; and a unit for controlling the tone signal generating unit to generate a tone signal corresponding to the phone number in case that the predetermined data is registered on the storing unit.

In operation, a user should put a predetermined symbol data at a head of the phone number when he or she registers the phone number at the electronic-memo mode. The electronic apparatus determines the digits contained in a memo as a phone number in light of the predetermined symbol data registered at the head of the phone number and thus can transmit the tone signal corresponding to the phone number onto a phone line.

The second object of the present invention can be achieved by an electronic apparatus capable of automatically dialing a phone number including:

a unit for storing data;

a unit for registering a predetermined data before data of the phone number to be manually dialed when the phone number is registered in the storing unit and for inputting another predetermined data after the data of the phone number for indicating termination of the manual dialing of the phone number;

a unit for generating a tone signal for dialing the phone number; and a unit for controlling the tone signal generating unit to generate a tone signal corresponding to a number to be input during an interval between the predetermined data and the another predetermined data.

In operation, the electronic apparatus serves to generate tone signals corresponding to the numbers input through the template keys provided on the apparatus itself during an interval from a timing of transmitting the automatic dialing number before the manual dialing number to a timing of inputting a signal indicating the end of the manual dialing.

The third object of the present invention can be achieved by an electronic apparatus including:

a unit for displaying data;

a plurality of input unit to be handled for rewriting at least one part of the content displayed on the displaying unit;

a unit for fixing display in a manner to fix the content displayed on the displaying unit in a display-fixing state; and a unit for selecting a predetermined input unit in a manner to validate a handling of the predetermined input unit and to invalidate a handling of the other input unit of the plurality of input unit.

The electronic apparatus further includes a unit for reversing the content displayed on the displaying unit when the display-fixing unit is set.

The electronic apparatus further includes a unit for automatically displaying the previously displayed content when power is turned off in the display-fixing state and then is turned on and setting the display-fixing state.

In operation, the electronic apparatus is capable of fixing the content displayed on the display unit with simple handling and easily releasing the fixed state in order to prevent the situation that the displayed content disappears with erroneous handling.

Further objects and advantages of the present invention will be apparent from the following description of the preferred embodiments of the invention as illustrated in the accompanying drawings.

BRIEF DESCRIPTION OF THE DRAWINGS

FIG. 9 is an explanatory view showing an example of the content displayed on an LCD provided in the electronic apparatus of the second embodiment;

FIG. 12 is a view showing a normal display state of the LCD provided in the third embodiment;

FIG. 13 is a view showing a display-fixing state of the LCD provided in the third embodiment.

DESCRIPTION OF THE PREFERRED EMBODIMENTS

An embodiment of the present invention will be described with reference to the drawings.

Figure 1:
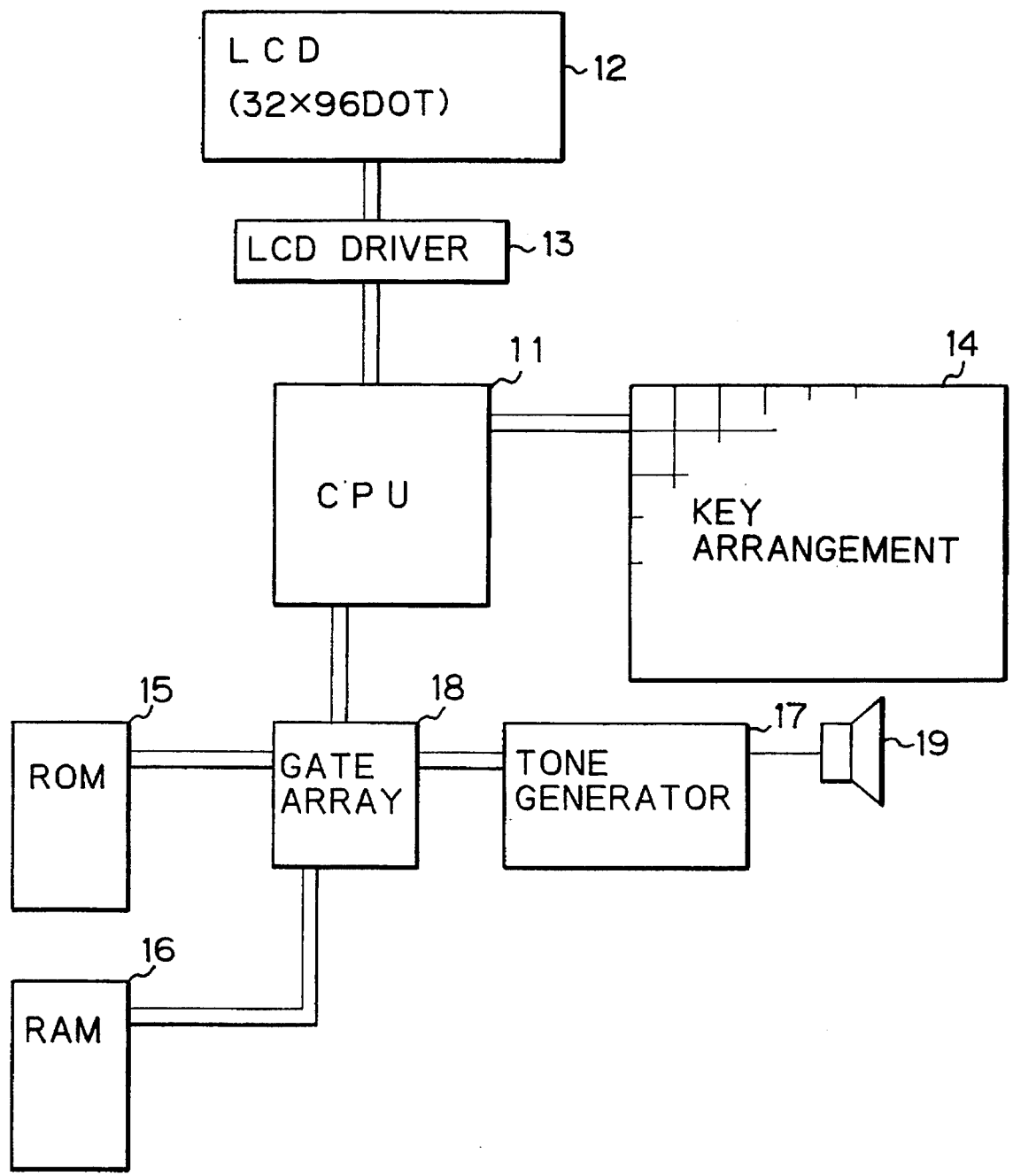
FIG. 1 is a block diagram showing an electronic apparatus providing an automatic dialing function according to a first to a third embodiments of the present invention.

FIG. 1 is a block diagram showing an electronic apparatus providing an automatic dialing function according to a first embodiment of the present invention.

As shown in FIG. 1, 11 denotes a central processing unit (referred to as CPU). The CPU 11 has functions of executing the processings at various functional modes such as a calendar display mode, a schedule storage/display mode, a phone mode for an electronic phone book or the like, a memo storage/display mode, and a Kanji (Chinese characters used in Japanese) dictionary display mode as well as automatically transmitting any phone number registered at a memo mode onto a phone line. The latter function will be described in detail later.

Figure 2:
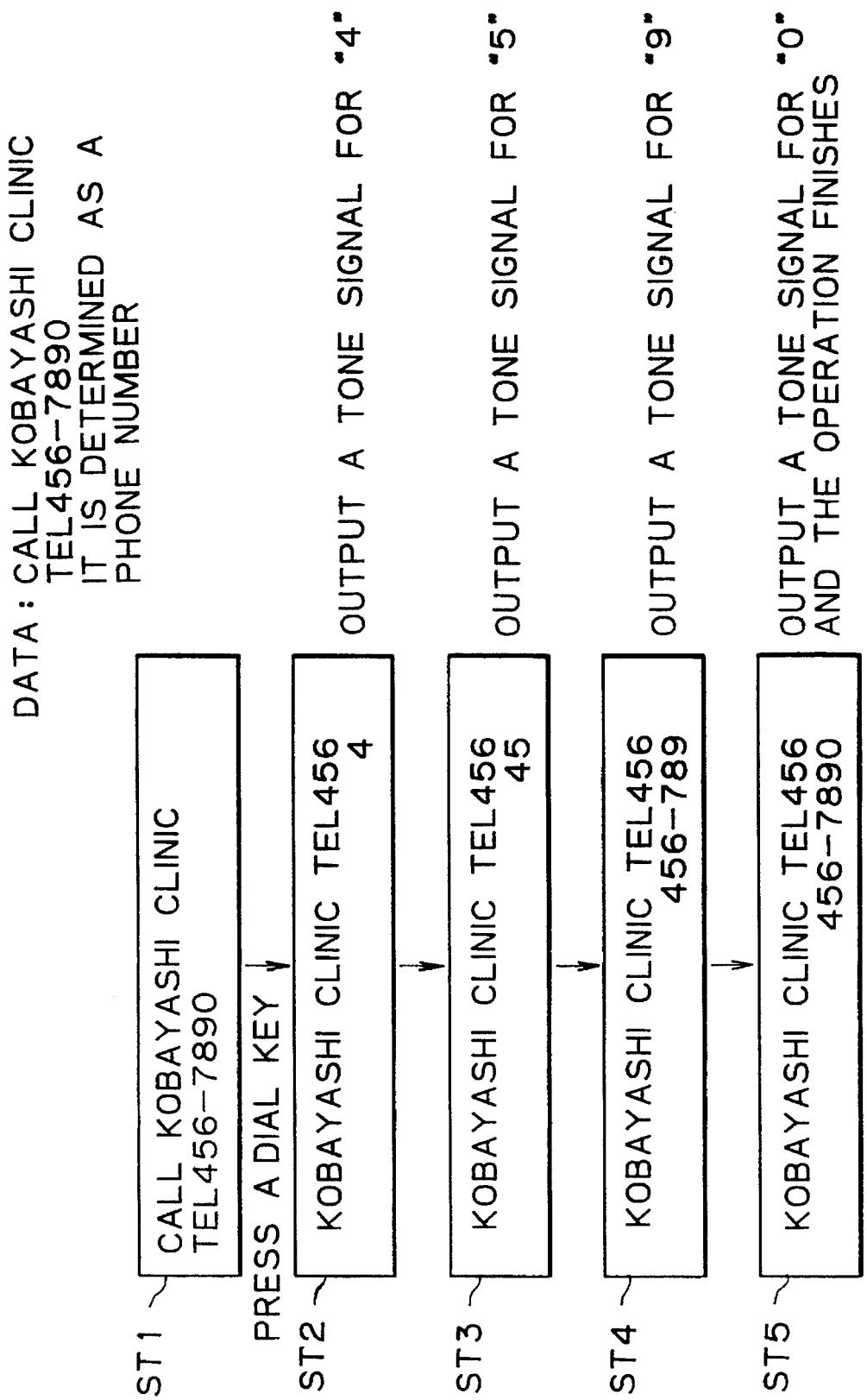
FIG. 2 is an explanatory view showing an example of the data displayed on an LCD (Liquid-Crystal Display) according to the first embodiment of the present invention.
Figure 3:
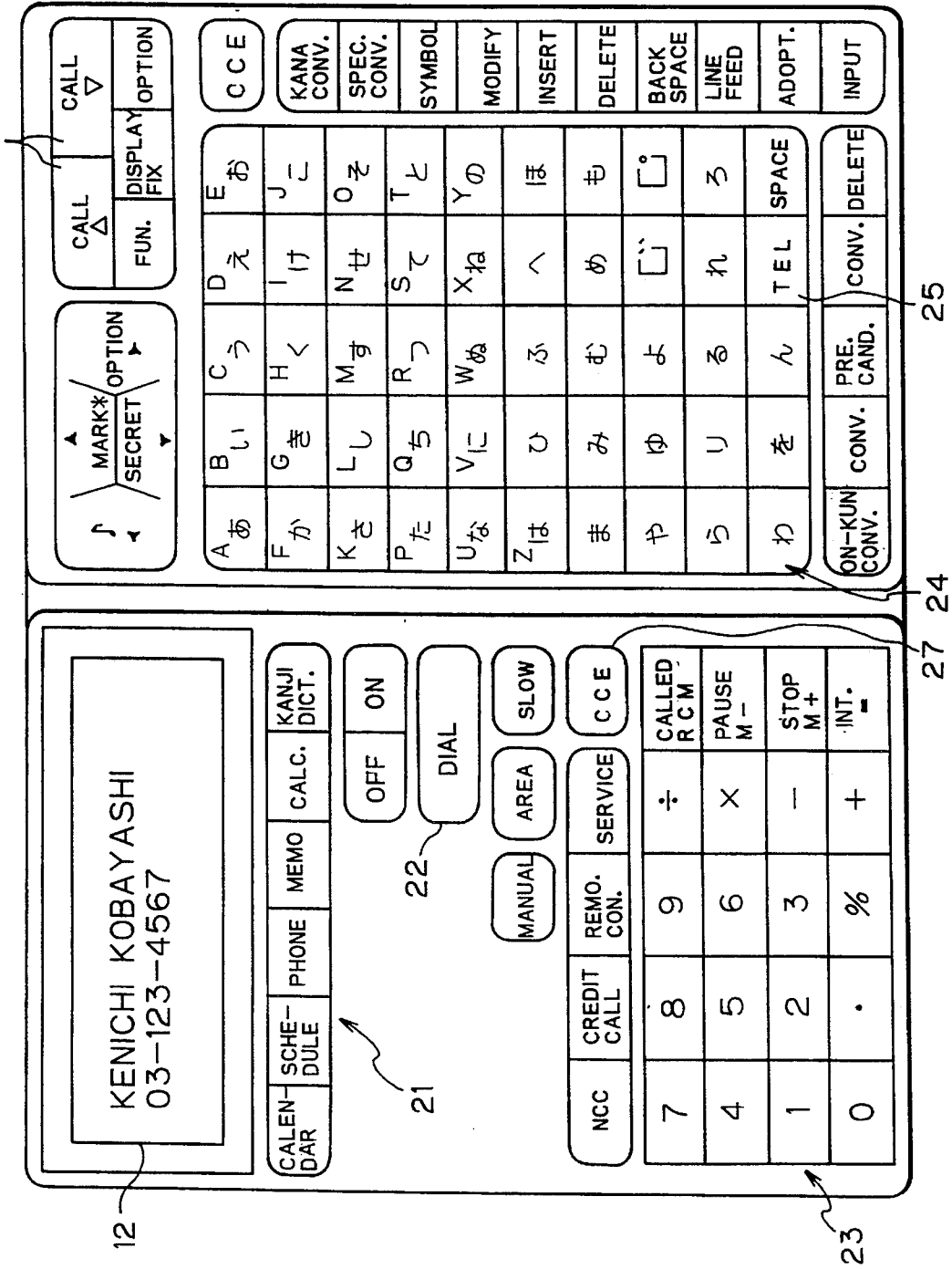
FIG. 3 is an explanatory view showing an example of key arrangement provided in the electronic apparatus shown in FIG. 1.

12 denotes a liquid-crystal display (referred to as LCD) which includes display elements in a matrix consisting of 32×96 dots, for example. The LCD 12 is controlled by the CPU 11 and an LCD driver 13 so that the LCD 12 can display data of the foregoing modes, for example, memo data as shown in FIG. 2.

Figure 8:
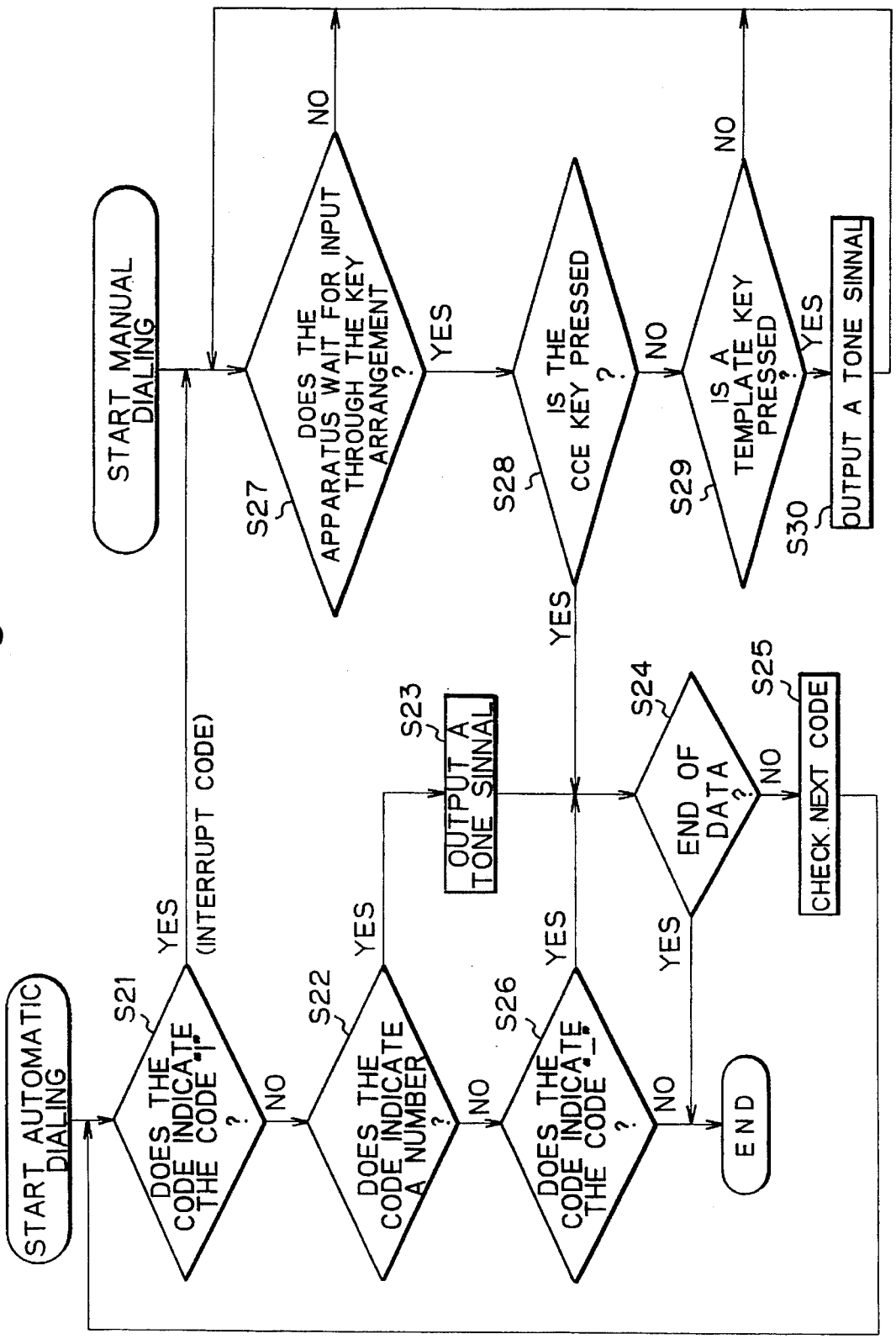
FIG. 8 is a flowchart for illustrating the automatic dialing function of the electronic apparatus according to the second embodiment.

14 denotes key arrangement, which includes mode-selecting keys 21 for selecting any one of the foregoing modes, a dial key 22 for transmitting a tone signal onto a phone line, template keys 23 for inputting digits such as a phone number, character input keys 24 for inputting kana characters, that is, Japanese syllabary and alphabetic characters, a symbol "TEL" key 25 for inputting a symbol for setting the digits input through the template keys 23 as a phone number, calling keys 26 for calling registered data, and so forth as shown in FIG. 8.

Figure 5:
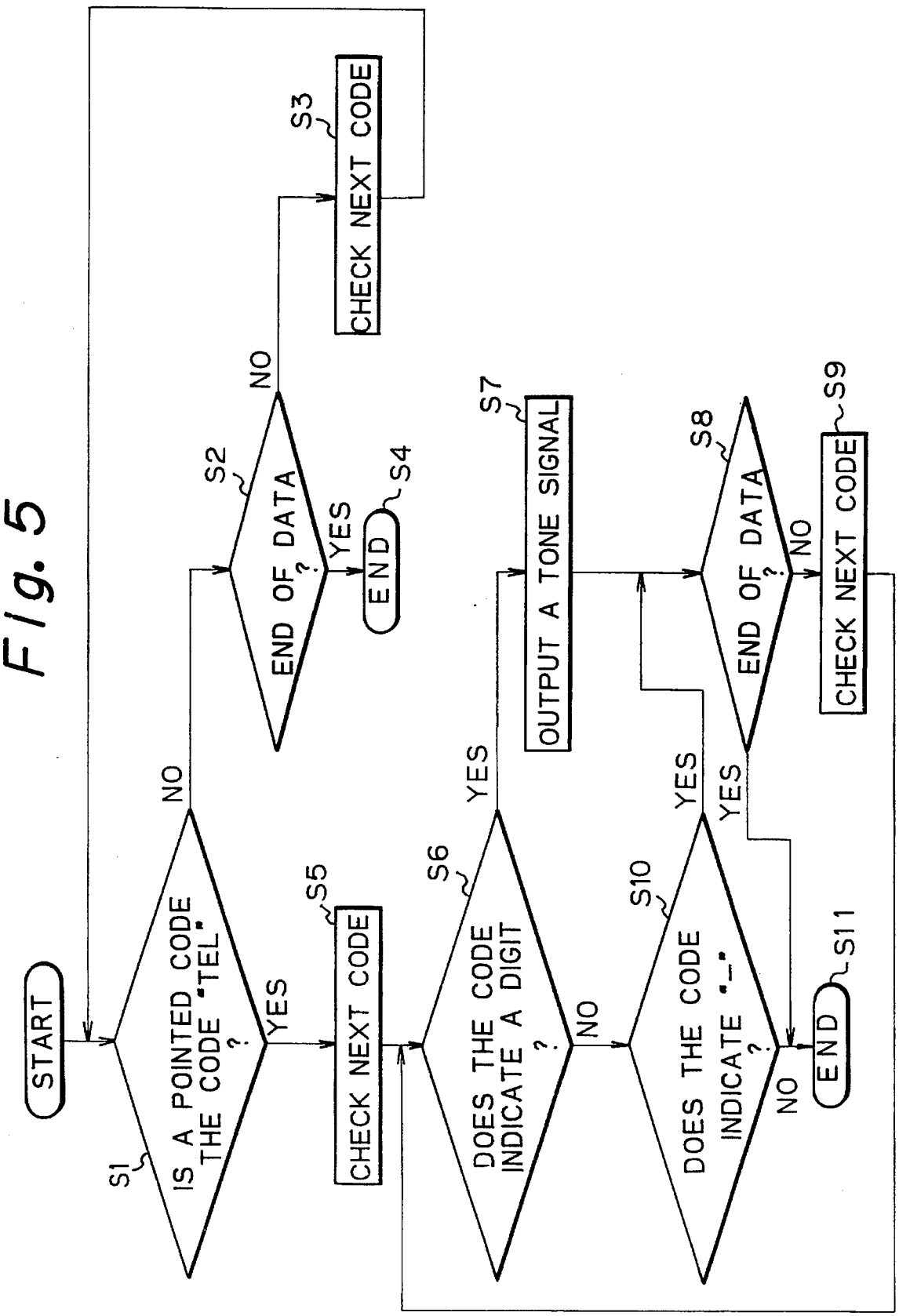
FIG. 5 is a flowchart for illustrating the automatic dialing function of the electronic apparatus shown in FIG. 1.

15 denotes a read-only memory (referred to as ROM). The ROM 15 pre-stores the programs on which the CPU 11 executes the processings at the foregoing various modes. In particular, the ROM 15 stores a program for automatically transmitting a phone number registered at the memo mode as shown in FIG. 5 and a display control program on which the CPU 11 controls the display in response to a user's input as shown in FIG. 2.

Figure 4:
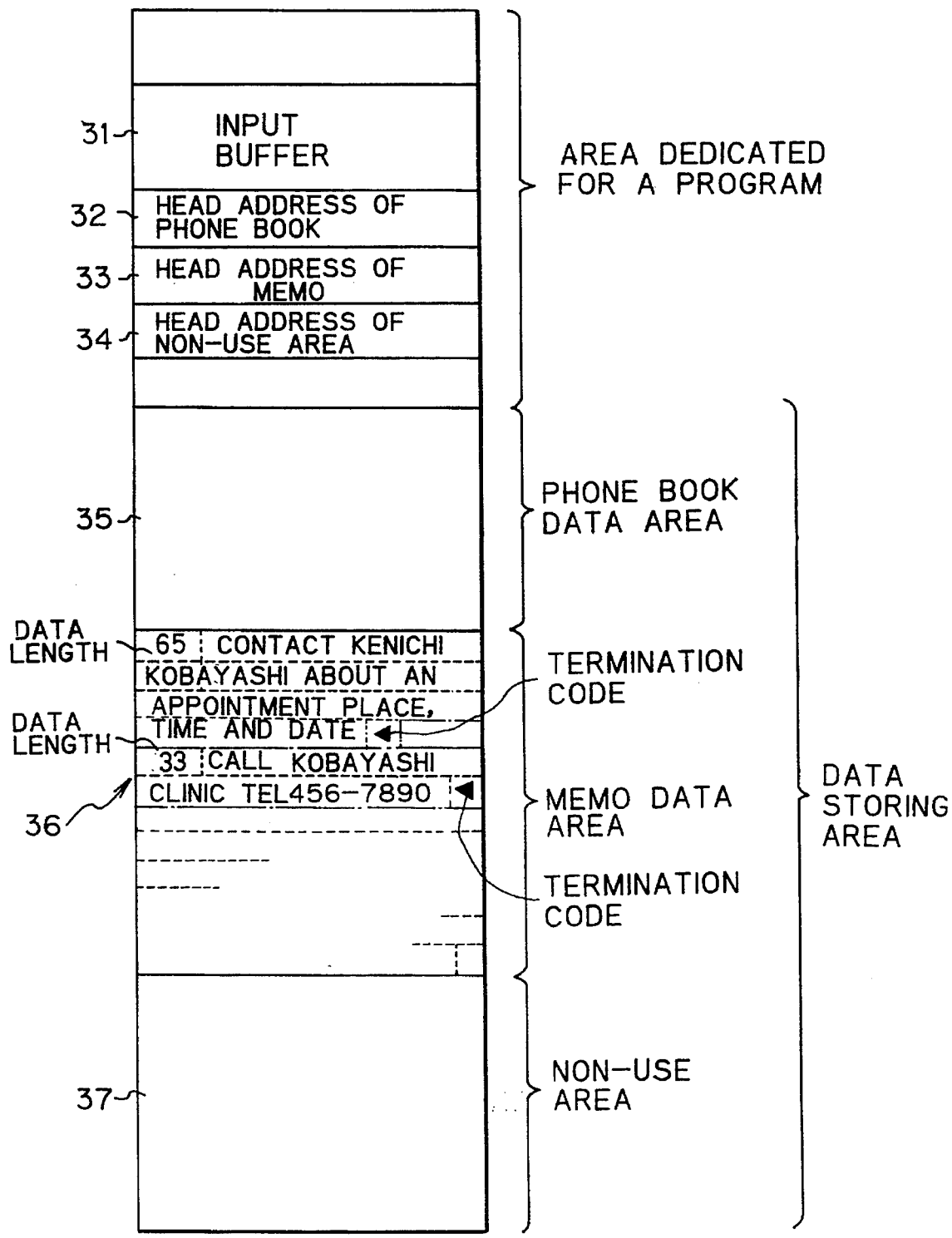
FIG. 4 is an explanatory view showing the stored content of a RAM provided in the electronic apparatus shown in FIG. 1.

16 denotes a random-access memory (referred to as RAM). The RAM 16, as shown in FIG. 4, includes an area dedicated for a program and an area dedicated for storing data in which the data input through the key arrangement 14 are stored in the inputting sequence. The data-storing area contains a phone book data area 35, a memo data area 36 and a non-use area 37. The area dedicated for a program contains an input buffer area 31 for temporarily storing data input through the key arrangement 14 and output data, and areas 32, 33 and 34 for storing each head address of the phone book data area 35, the memo data area 26 and the non-use area 37, respectively. Further, the RAM 16 is backed up by a battery (not shown) so as to prevent the disappearance of the data stored in the RAM 16.

For example, a user selects a phone-book mode (presses "phone" key) with the mode-selecting keys 21 and inputs a name and his phone number with the template keys 23 and the character input keys 24. The data about the input name and phone number are temporarily stored in the input buffer area 31 and then sequentially registered in the phone-book data area 35, the head address of the phone-book data area 35 is stored in the area 32.

As another example, the user selects a memo mode (presses "memo" key) with the mode-selecting keys 21 and inputs the memo data with the template keys 23 and the character input keys 24. The memo data are temporarily stored in the input buffer area 31 and then are sequentially registered in the memo data area 36. The head addresses of the memo data area 36 and the non-use area 37 are stored in the areas 33 and 34, respectively. In the memo data area 36, a data length is stored before the memo data and a termination code is stored after the memo data. In case that the memo data contains a phone number, that is, the user presses the symbol "TEL" key 25 and then input the digits corresponding to the phone number with the template keys 23, the phone number consisting of a code "TEL" and the input digits are registered at the memo mode.

In the foregoing registering state, when the user handles the calling keys 26, the CPU 11 serves to check the addresses stored in the head address areas 32 and 33, to copy the head data of the phone-book data area 35 and the memo data area 36 to the input buffer area 31, and to display these head data on the LCD 12. Each time the user handles the calling keys 26, the next data is read out with the head address of the current displayed data plus the data length of the next data and is displayed on the LCD 12. In case that the head address of the next data matches to the head address of the non-use area head address 34, it indicates that the next data is not registered. Then, this display processing is terminated.

Turning to FIG. 1, 17 denotes a tone generator which serves to generate a tone signal (DTMF signal) having each frequency matching to each digit of a phone number (0, 1, 2 to 9, #, *) if the CPU 11 instructs the phone number through a gate array 18. The tone signal is sent out to the phone line through a speaker 19 in the state that the speaker 19 is located in contact with a telephone microphone (not shown).

Next, the description will be directed to the operation of automatically transmitting a phone number registered at the memo mode onto a phone line with reference to FIG. 5.

As shown in FIG. 2, it is assumed that the memo data about "Call Kobayashi Clinic TEL456-7890" is registered in RAM 16 through the key arrangement 14. In case that the memo data in RAM 16 are called, the data are displayed on the LCD 12 as shown in the step ST1 of FIG. 2.

In case that the user presses the dial key 22 in the display state shown in the step ST1 of FIG. 2, the program of the operation shown in FIG. 5 is started to be executed. At first, the head address of the memo data stored in the input buffer area 31 of the RAM 16 is stored in a pointer. Then, it is determined whether or not the code saved in the address indicated by the pointer is the code "TEL" (step S1).

Likewise, it is determined repeatedly whether or not each character code is the code "TEL" by incrementing the pointer one by one. If not, the program does not execute the automatic transmitting of the tone signal (steps S1 to S4). If yes, the process goes to steps S5 and S6 at which it is determined whether or not the next code is a digit (0, 1, 2 to 9, #, *). If yes, the program serves to control the tone generator 17 so that the tone generator 17 can generate a tone signal having the frequency matching to the digit for an interval of 100 ms (millisecond) (steps S5 to S9). If the next code is the code "–", the program serves to control the tone generator 17 so that the tone generator 17 stops generating the tone signal (step S10).

While the tone signal is generated, as shown in the steps ST2 to ST5 of FIG. 2, the numbers corresponding to the tone signals are displayed on the LCD 12 in sequence. In case it is determined that the next code is a termination code of the memo data, the processing is terminated (step S11).

As has appreciated from the above description, the electronic apparatus such as the automatic dialing device according to the first embodiment is arranged to have the code "TEL" at the head of a phone number if the phone number is registered as the memo. Hence, the electronic apparatus is capable of determining the digits following the code "TEL" as a phone number and automatically dialing the phone number so that the phone number registered at the phone-book mode as well as the memo mode is allowed to be automatically transmitted to the phone line.

Though the foregoing embodiment employs the code for registering the phone number at the memo mode as the code "TEL", it goes without saying that any character or symbol may be used as the code if it is not used in the normal memo data.

In turn, the description will be directed to the electronic apparatus having a capability of automatically dialing a phone number according to a second embodiment of the present invention with reference to FIGS. 1, 3, and 6 to 8.

The electronic apparatus according to the second embodiment is arranged in a similar manner to the first embodiment. Hence, for the overall arrangement, see FIG. 1 illustrated with respect to the first embodiment. However, the CPU 11 included in the second embodiment has another function of switching automatic dialing to manual dialing, which will be described later. The ROY 15 also stores another program for switching automatic dialing to manual dialing.

Figure 6:
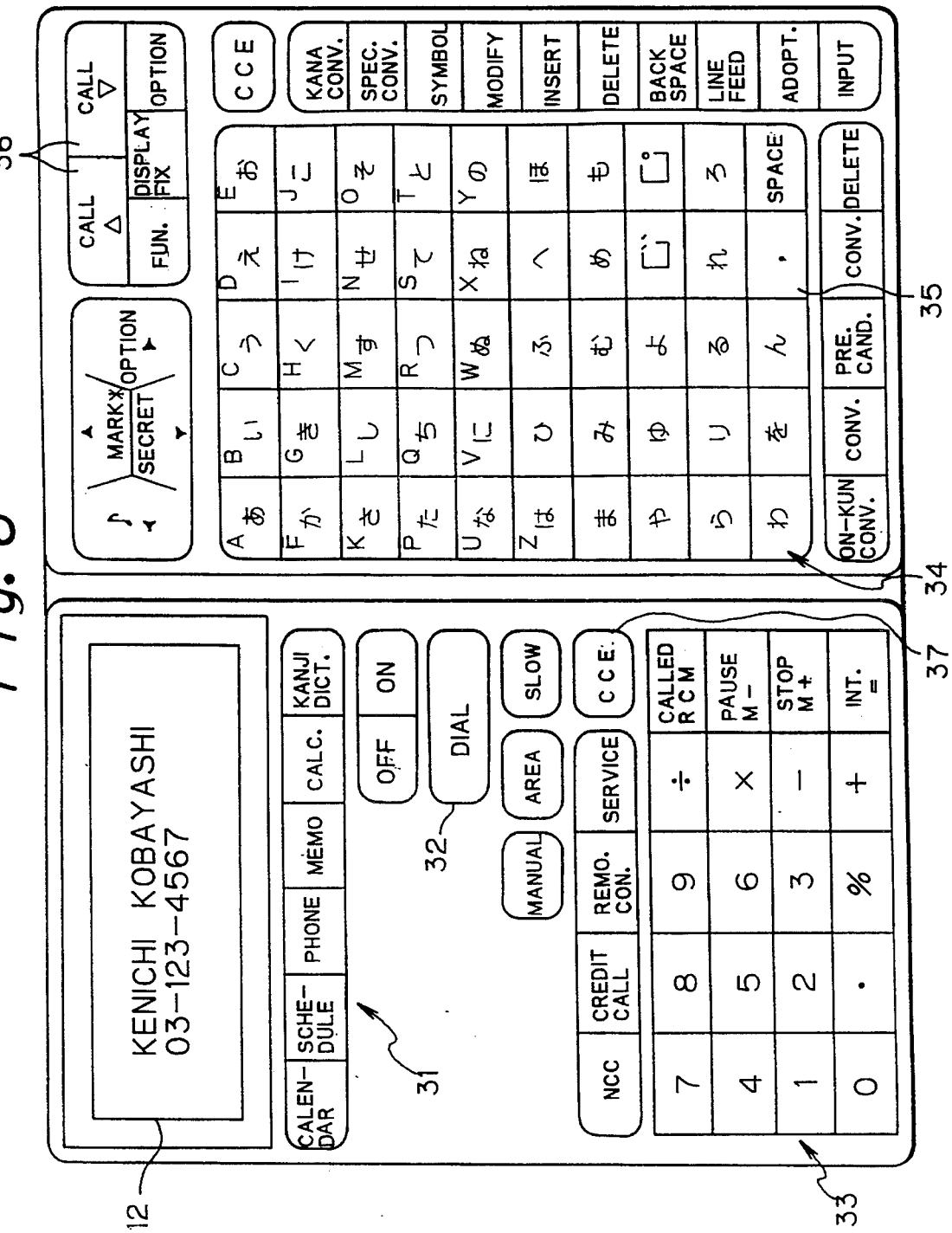
FIG. 6 is an explanatory view showing another example of key arrangement provided in an electronic apparatus according to a second embodiment of the present invention.

FIG. 6 shows a concrete example of the key arrangement 14. The key arrangement 14 shown in FIG. 8 is similar to that shown in FIG. 8 except the symbol "TEL" is replaced with ",". The key arrangement 14 includes mode-selecting keys 31 for selecting any one of various modes (see the description with respect to FIG. 1), a dial key 32 for transmitting a tone signal onto a phone line, template keys 33 for inputting digits such as a phone number, character input keys 34 for inputting kana characters and alphabetic characters, a symbol "," key 35, calling keys 36 for calling registered data, a CCE key 37 for switching manual dialing to automatic dialing, and so forth.

Figure 7:
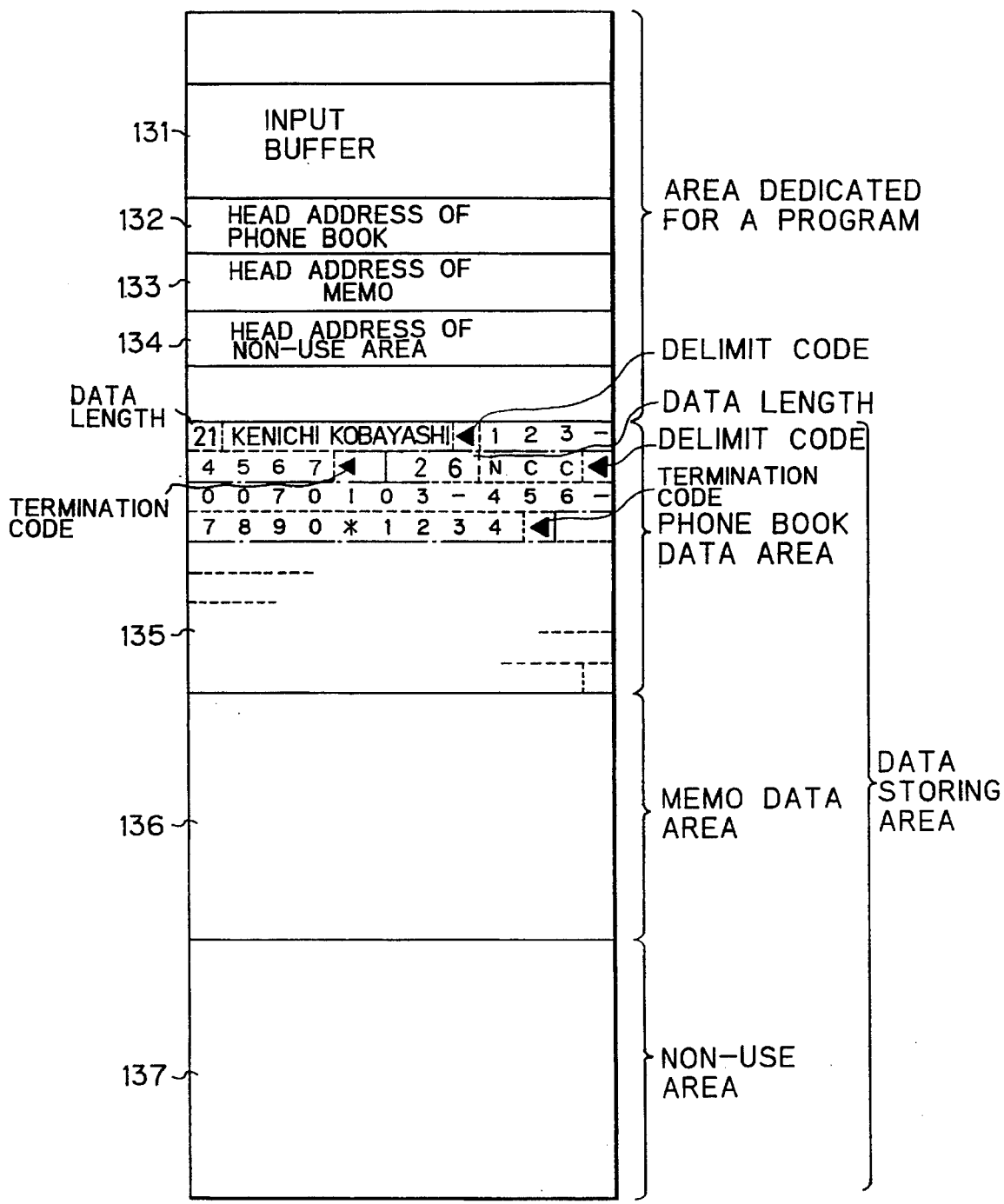
FIG. 7 is an explanatory view showing the stored content of a RAM provided in the electronic apparatus of the second embodiment.

Turning to FIG. 7, the RAM 16 (see FIG. 1) includes an area dedicated for a program and an area dedicated for storing data in which the data input through the key arrangement 14 are stored in the inputting sequence. The data-storing area contains a phone book data area 135, a memo data area 136 and a non-use area 137. The area dedicated for a program contains an input buffer area 131 for temporarily storing data input through the key arrangement 14 and output data, and areas 132, 133 and 134 for storing each head address of the phone book data area 135, the memo data area 136, and the non-use area 137, respectively.

For example, a user selects a phone-book mode with the mode-selecting key 3I and inputs a name and his phone number with the template keys 33 and the character input keys 34. The data about the input name and phone number is temporarily stored in the input buffer area 131 and then sequentially registered in the phone-book data area 135, the head address of the phone-book data area 135 is stored in the area 132. In the phone-book data area 135, a data length is stored before each piece of data and a termination code is stored after each piece of data. Further, in case that the user inputs a manual interrupting symbol "I" through the character input keys 34, a code "I" is stored as a code for switching automatic dialing to manual dialing.

In the illustration shown in FIG. 7, the stored data composed of an NCC (New first Common Carrier) name, a number "0070" for the NCC name, a manual dialing interrupt code "I", a caller's phone number "03-456-7890", a code "*" for delimiting the phone number from a password number, and the password number "1234" are registered in sequence.

Consider that the user selects an electronic-memo registration mode through the mode-selecting keys 31 and input memo data through the template keys 33 and the character input keys 34. The memo data at the memo mode are temporarily stored in the input buffer area 131 and then are sequentially registered in the memo data area 136. The head addresses of the memo data area 136 and the non-use area 137 are respectively stored in the areas 133 and 134, When the user presses the callings keys 36 at the phone-book mode, the CPU 11 (see FIG. 1) serves to check the addresses stored in the phone-book head address area 132 and the memo head address area 133, to copy the head data of the phone-book data area 135 to the input buffer area 131, and to display these head data on the LCD 12. Each time the user presses the calling keys 36, the next data is read out with the head address of the current displayed data plus the data length of the next data and is displayed on the LCD 12. In case that the head address of the next data matches to the head address of the non-use area head address 134, it indicates that the next data is not registered. Then, this display processing is terminated.

As has been described with respect to the first embodiment, the tone generator 17 (see FIG. 1) serves to generate a tone signal (DTMF signal) having each frequency matching to each digit of a phone number if the CPU 11 instructs the phone number (0, 1, 2 to 9, #, *) through a gate array 18. The tone signal is sent out to the phone line through a speaker 19 in the state that the speaker 19 is located in contact with a telephone microphone (not shown).

Next, the description will be directed to the operation of switching the manual dialing to the automatic dialing for transmitting a phone number to be dialed manually with reference to FIGS. 8 and 9.

As mentioned above, assume that the RAM 16 has already stored the data composed of the NCC number "0070", the manual dialing interrupt code "I", the caller's phone number "03-456-7890", and the password number "1234" registered through the key arrangement 14 (see FIG. 1). In case that the data are called, the data are copied to the input buffer area 131 (see FIG. 7) and are displayed on the LCD 12.

In displaying the data, the dial key 32 is pressed so as to start the tone-transmitting program shown in FIG. 8 and the display control program shown in FIG. 9.

At first, the head address of the memo data stored in the input buffer area 131 of the RAM 16 is stored in a pointer. Then, it is determined whether or not the code saved in the address indicated by the pointer is the code "I" (step S21).

It not, the process goes to a step S22 at which it is determined whether or not the code indicates a digit, that is, a phone number. In case that it indicates a phone number, the program serves to control the tone generator 17 so that the tone generator 17 can generate a tone signal having a frequency corresponding to the digit during an interval of 100 ms (steps S23 to S25). In case the next code is the code "–", the program serves to control the tone generator 17 so that the tone generator 17 stops generating the tone signal (step S26).

Likewise, by incrementing the pointer one by one, it is repeatedly determined whether or not each character code is the code "T" If the code is the code "T", the process branches from the step S21 to the step S27.

At the step S27, the program waits for the input supplied through the key arrangement 14. In case that the input is a digit supplied through the template keys 33, the program serves to control the tone generator 17 so that it can generate a tone signal having a frequency corresponding to the digit (steps S29 and S30). If the CCE key 37 (see FIG. 6) is pressed (step 28), the process returns to the step S24.

While the tone signal is generated, as shown in FIG. 9, the digit corresponding to the generated tone signal is sequentially displayed on the LCD 12. In case it is determined that the code is a termination code, the processing is terminated.

As has appreciated from the above description, the electronic apparatus having the automatic dialing capability according to the second embodiment is allowed to register the code "T" at the head of a phone number to be manually dialed. Hence, the electronic apparatus allows the caller (user) to manually dial the phone number of the called person during an interval between the code "T" to the pressing of the CCE key 37. It results in making it possible to switch from automatic dialing to manual dialing with simple operation even if the speaker 19 is kept in contact with a speaker of a public phone.

Though the second embodiment employs the code for switching from the automatic dialing to the manual dialing as the code "T", it goes without saying that any character or symbol may be used as the code if it is not used in the normal memo data.

In turn, the description will be directed to a third embodiment of the present invention.

The arrangement of the third embodiment is similar to that of the first embodiment. Hence, see FIG. 1 and its relevant description with respect to the first embodiment.

Figure 10:
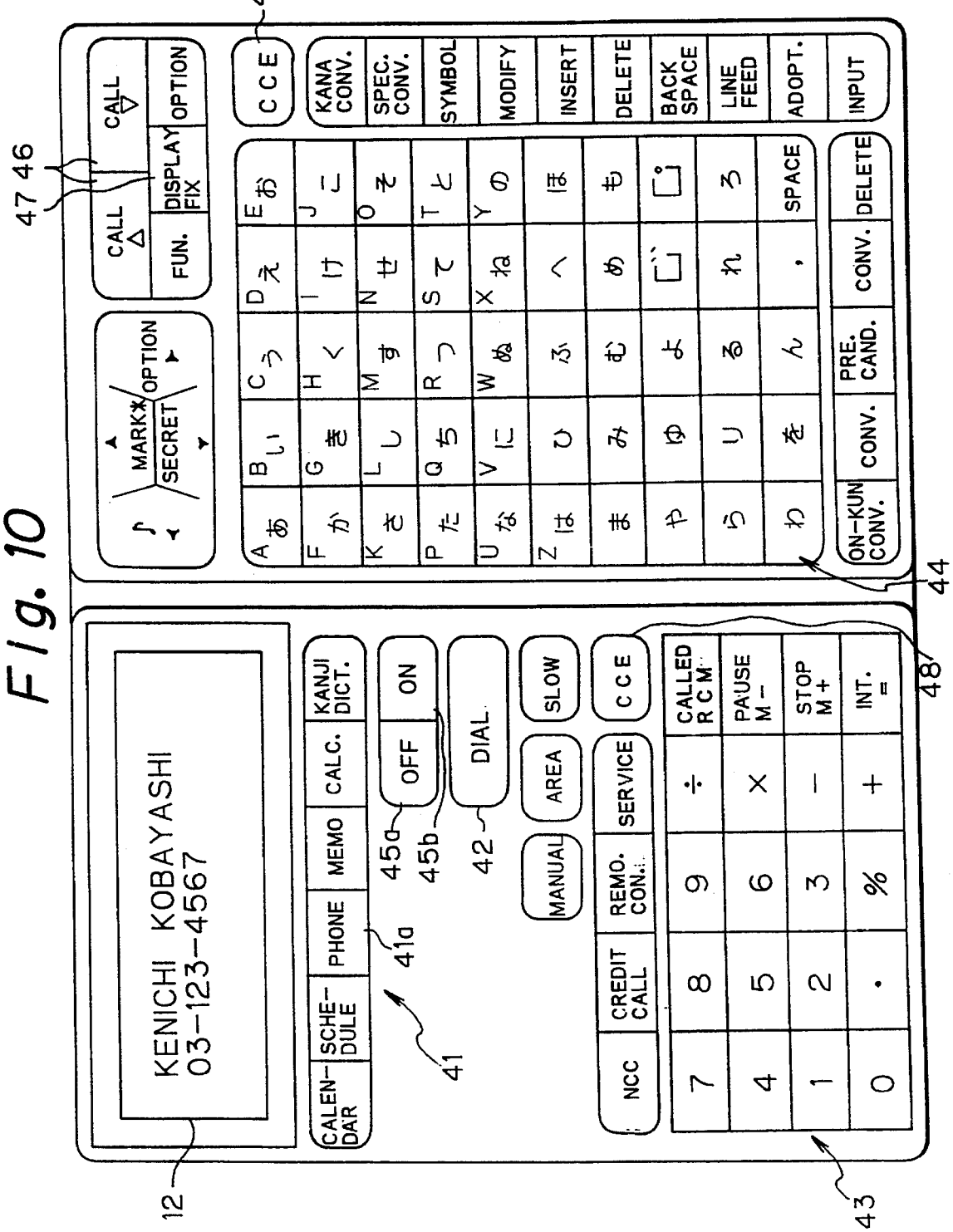
FIG. 10 is an explanatory view showing an example of key arrangement provided in an electronic apparatus according to a third embodiment of the present invention.

FIG. 10 is an explanatory view showing an example of key arrangement provided in an electronic apparatus according to a third embodiment of the present invention.

The electronic apparatus called an electronic note according to the third embodiment is also similar to the second embodiment. As shown in FIG. 10, the key arrangement (see FIG. 1) 14 includes mode-selecting keys 41 for selecting any one of various modes (see the description with respect to FIG. 1), a dial key 42 for transmitting a tone signal onto a phone line, template keys 43 for inputting digits such as a phone number, character input keys 44 for inputting kana characters, that is, Japanese syllabary and alphabetic characters, a power off key 45a, a power on key 45b, calling keys 46, a display fixing key 47 for setting or releasing a display-fixing state, and so forth. Further, the different point of the second embodiment is that CCE keys 48 are served as clear keys.

Figure 11:
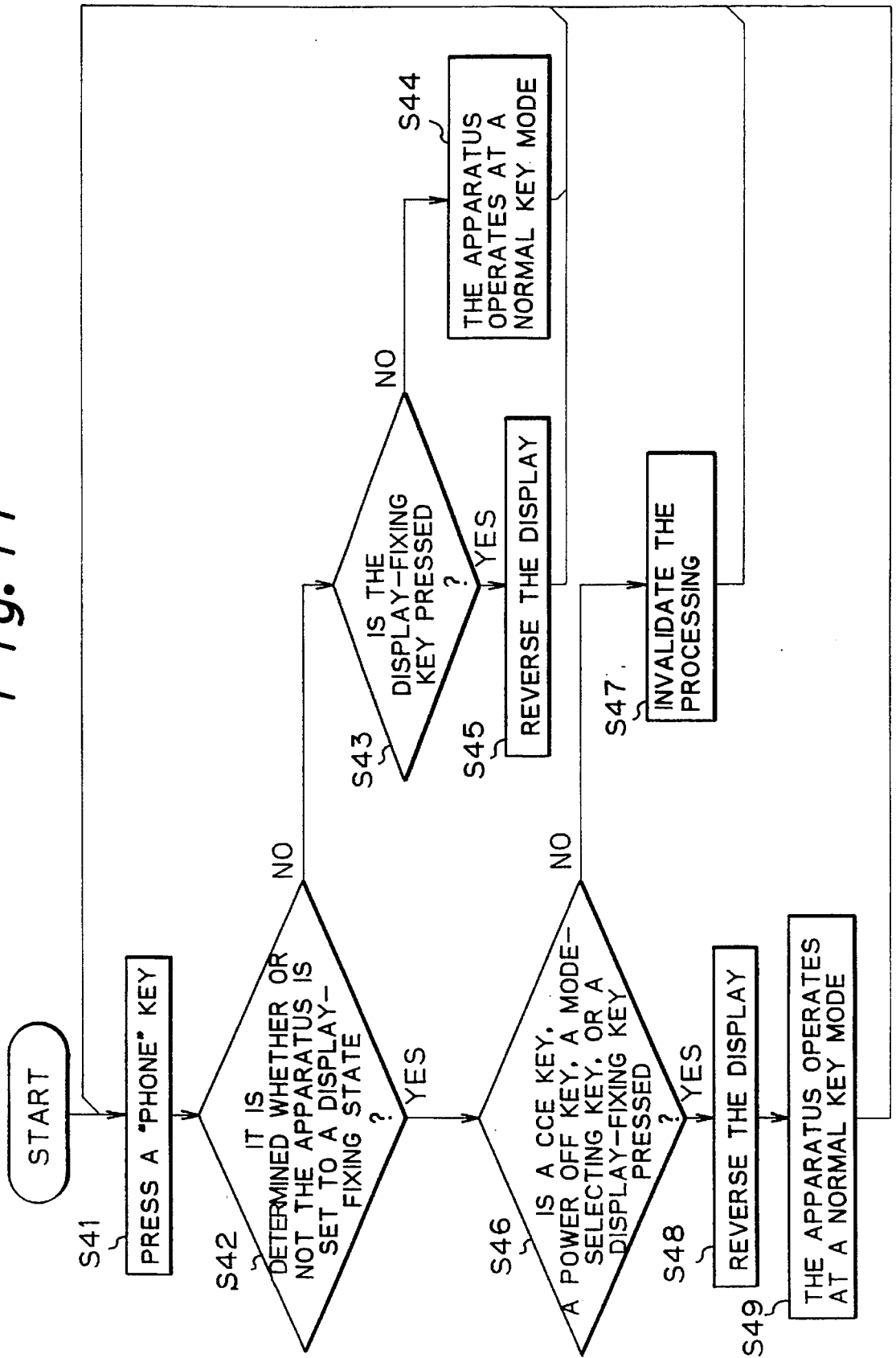
FIG. 11 is a flowchart for illustrating the operation of the electronic apparatus according to the third embodiment of the present invention.

The operation of the electronic note according to the third embodiment will be described with reference to FIG. 11.

This electronic note is used as a phone book. At first, a "phone" key 41a of the mode-selecting keys 41 is pressed (step S41). At the step S42, it is determined whether or not the display-fixing state mode is set. Then, the process goes to a step S43 at which it is determined whether or not the display-fixing key 47 is pressed. In case that the display-fixing key 47 is not pressed, the electronic note operates at the normal key mode, that is, the phone-book mode (step S44). The steps S41 to S44 are repeated until the display-fixing key 47 is pressed so that a person's name or a phone number is retrieved for displaying a desired phone number.

That is, with the template keys 43 and the calling keys 46, an object person's name is retrieved so that the person's name is displayed on the LCD 12. An example of the display is shown in FIG. 12.

In case that the electronic note does not operate at the display-fixing mode, the mode-selecting keys 41, the template keys 43, the CCE keys 48, and the power off key 45a function as data keys. With any one of the data keys being pressed, the content displayed on the LCD 12 is changed. When the user presses the display-fixing key 47 for setting a display-fixing state, the process goes from the steps S43 to S45. At the step S45, the fixing-display state is set and the display of the LCD 12 is switched from the normal display state shown in FIG. 12 to a reverse state shown in FIG. 13. By reversing the display, it is easy to recognize the set of the fixing-display state.

As the user is seeing the phone number displayed on the LCD 12, the user dials the phone. Or, in case that the user presses the dial key 42 when the phone number is displayed on the LCD 12, the tone generator 17 (see FIG. 1) generates a tone signal corresponding to the phone number. Then, the tone sound comes out of the speaker 19 so as to automatically dial the phone number.

In case that the user presses any one of the keys except the data keys and the template keys 43 contained in the data keys in the display-fixing state, the process goes through the steps S42 and S46 to the step S47 at which the key handling is invalidated. Hence, no change takes place on the content displayed on the LCD 12.

In case that the user wants to change the mode, the content displayed on the LCD 12, and suspend the use of the electronic note, in tile display-fixing state, any one of data keys (the mode-selecting keys 41, the CCE keys 48, and the power off key 45a in the present embodiment) is pressed. Then, the process goes from the steps S46 to S48 at which the content displayed on the LCD 12 is switched from the reverse state shown in FIG. 13 to the normal state shown in FIG. 12. At a time, the display-fixing state is released, resulting in making it possible for the electronic note to perform the processing assigned to each key, that is, allowing the electronic note to operate at a normal mode (step S49). At the step S46, if the power off key 45a is pressed, without returning the content displayed on the LCD 12 and releasing the display-fixing state, the data displayed on the LCD 12 and the information about whether the electronic note operates in the display-fixing state or not are stored in a predetermined area of the RAM 16. Then, the power is turned off. This processing is performed in the APO (Auto Power Off) processing.

Figure 14:
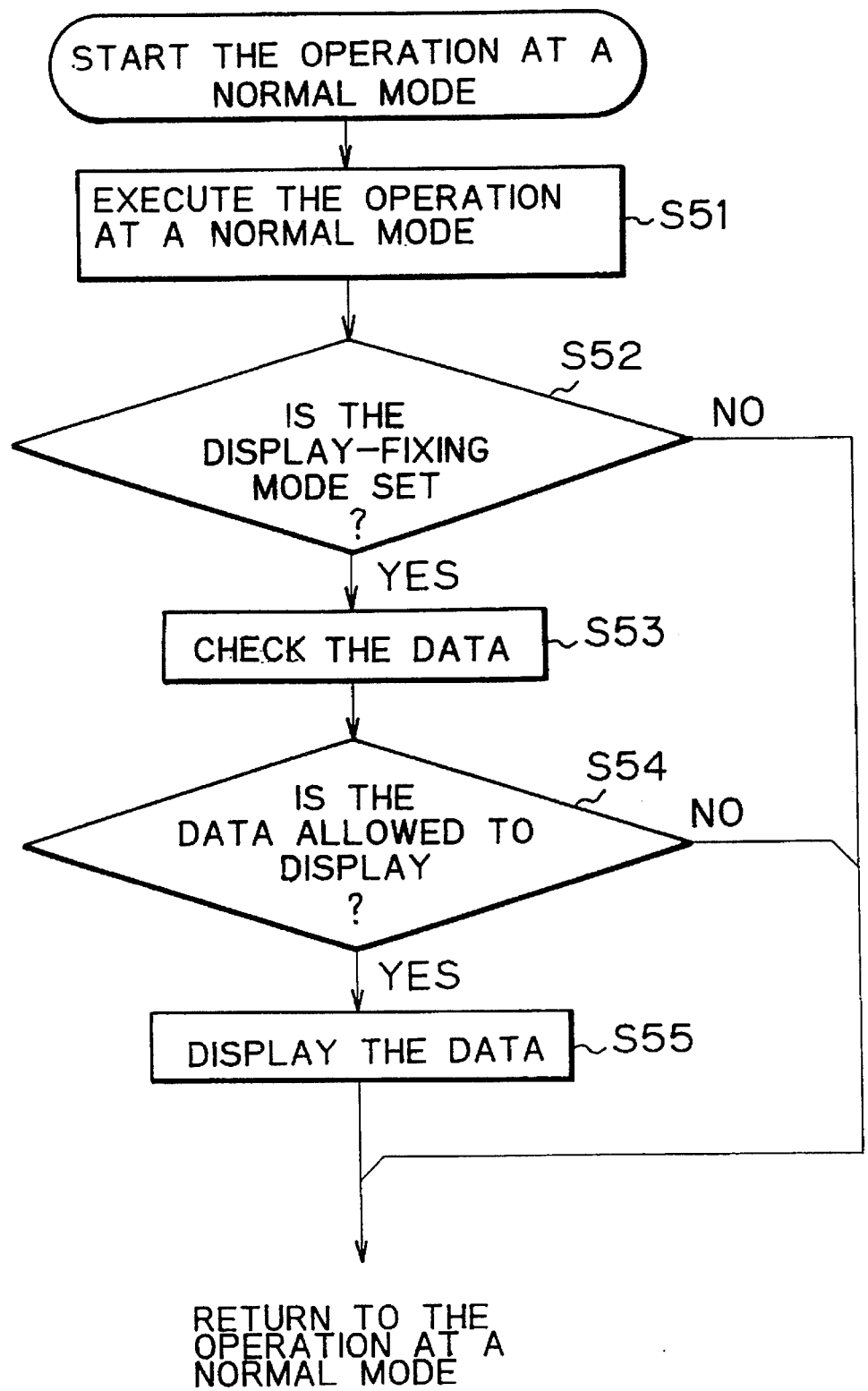
FIG. 14 is a flowchart for illustrating the operation of the electronic apparatus according to the third embodiment of the present invention.

Turning to FIG. 14, the processing is carried out on the assumption that the power is turned off without releasing the display-fixing state and the power on key 45b is pressed.

With the power on key 45b being pressed for starting the electronic note, after the normal on processing is carried out (step S51), it is determined whether or not the electronic note operates in the display-fixing state by reading the data stored in the RAM 16 (step S52). In case the electronic note does not operate in the display-fixing state, the electronic note waits for the inputting by the keystroke. In case that the electronic note operates in the display-fixing state, the CPU 11 (see FIG. 1) reads the data about the displayed content stored in the RAM 16 and checks the data (step S53) for determining whether or not the data are allowed to be displayed (step S54). In case that the data are disallowed to be displayed, the electronic note waits for the inputting by the keystroke. In case that the data are allowed to be displayed, the data read from the RAM are displayed on the LCD 12 (see FIG. 10). It results in allowing the third embodiment to automatically perform the previously displayed content.

Many widely different embodiments of the present invention may be constructed without departing from the spirit and scope of the present invention. It should be understood that specific embodiments described in the specification, except as defined in the appended claims.

What is claimed is:

1. An electric apparatus for interposing a manual dialing operation in an automatic dialing operation, comprising:

a memory for storing multiple data including memo data, a phone number to be automatically dialed via said automatic dialing operation, and a first predetermined code for indicating a starting of said manual dialing operation;

a first means for inputting the multiple data to said memory and for inputting a second predetermined code for indicating a termination of said manual dialing operation, and for reading said phone number and said first predetermined code inputted to said memory;

said first means including at least a first key for inputting the first predetermined code for indicating starting of said manual dialing operation and a least a second key for inputting the second predetermined code for indicating said termination of manual dialing operation;

a second means for generating a tone signal corresponding to said phone number read from said memory and for outputting the generated tone signal; and means for controlling the operation of said first and second means such that said manual dialing mode is entered during a pause in said automatic dialing operation after said first predetermined code is read by said first means, and said means for controlling terminates said manual dialing mode when said second predetermined data is inputted by said first means upon completion of manual dialing operation.

2. The electronic apparatus according to claim 1, wherein said apparatus further comprises a liquid crystal display for displaying the multiple data, a liquid crystal display driver for controlling said display, and a speaker for outputting a sound corresponding to the tone signal, said controlling means includes a central processing unit for controlling a processing at a plurality of modes, said first means includes a key arrangement for inputting the multiple data, said second predetermined data and a phone number to be manually dialed, and said memory includes a read-only memory for storing programs for said modes and a random-access memory for temporarily storing the multiple data and said programs.

3. The electronic apparatus according to claim 2, wherein said key arrangement includes mode-selecting keys for selecting each of said modes, a dial key for sending out the tone signal to a phone line, template keys for inputting digits, character input keys for inputting characters and alphabets, and calling keys for calling the data inputted by said first means.

* * * * *